US United States Patent [19]

Spain et al.

[11] 4,096,104
[45] Jun. 20, 1978

[54] FINISH COMPOSITION FOR FIBROUS MATERIAL

[75] Inventors: Raymond G. Spain, Huntington Beach; Albert L. Miller, Torrance, both of Calif.

[73] Assignee: Hitco, Irvine, Calif.

[21] Appl. No.: 740,253

[22] Filed: Nov. 10, 1976

[51] Int. Cl.$^2$ .......................................... C08L 91/00
[52] U.S. Cl. ............................ 260/28.5 B; 28/169; 8/115.6; 427/154; 427/401; 427/434 D; 427/443; 428/364; 428/367
[58] Field of Search ............... 260/28.5 A, 28.5 B, 260/29.7 B; 427/154, 401, 443, 434 D; 428/367, 364; 28/75 R, 76 R; 55/66; 8/115.6

[56] References Cited

U.S. PATENT DOCUMENTS

| | | | |
|---|---|---|---|
| 2,686,954 | 8/1954 | Parker | 28/75 R |
| 2,840,442 | 6/1958 | Abrams et al. | 28/75 R |
| 3,007,825 | 11/1961 | Cubberley et al. | 260/28.5 A |
| 3,192,172 | 6/1965 | Behnke | 260/28.5 A |
| 3,231,540 | 1/1966 | Vanderbilt | 28/75 R |
| 3,369,932 | 2/1968 | Sawyer et al. | 260/28.5 A |
| 3,597,256 | 8/1971 | Young | 28/75 R |

*Primary Examiner*—Lewis T. Jacobs
*Attorney, Agent, or Firm*—Fraser and Bogucki

[57] ABSTRACT

A finish composition for fibrous material such as carbon, graphite or silica fibers comprises an aqueous emulsion of an elastomer and a lubricious substance which are both dispersed in the aqueous emulsion. The elastomer comprises a latex of butyl rubber or butadiene/nitrile type rubbers, and the lubricious substance comprises an emulsion of a hydrocarbon type wax such as paraffin. The aqueous emulsion which includes a dispersant such as water proportioned to provide the emulsion with a solids concentration of up to about 1% is applied as a size to the fibrous material, following which the water is driven off such as by use of elevated temperatures to cause the lubricious substance to separate from the elastomer and exude to the surface of the elastomeric sheath surrounding the fibrous material. The finish may be used as an aid to weaving, in which event it is applied to fibers such as carbon or graphite fibers prior to weaving and then removed after the weaving is completed. Also the finish may be applied and allowed to remain on fibers such as those of substantially silica composition to enhance abrasion resistance, anti-dusting qualities and other properties of already woven materials.

16 Claims, No Drawings

FINISH COMPOSITION FOR FIBROUS MATERIAL

BACKGROUND OF THE INVENTION

1. Field of the Invention

The present invention relates to finish compositions for fibrous materials, and more particularly to compositions comprised of elastomeric material, a lubricious substance and water which are coated onto the fibers or filaments of materials such as carbon, graphite or silica to protect the materials during weaving or other use which involves bending, abrading and the like.

2. History of the Prior Art

The textile arts have of late been substantially influenced by the development of a variety of fibrous and filamentous strands in the form of yarns, tow, and rovings of high tensile strength, high elastic modulus materials such as carbon, graphite, and a variety of inorganic substances. Because of their strength and refractory capabilities, such materials find use in a variety of applications including aerospace materials, both ablative and otherwise, and in the manufacture of sporting goods. In still other instances the materials are useful as heat shields and other protective barriers such as in welding environments.

In many applications, it is preferred that the fibers, filaments, yarns or tows be woven into a fabric or tape or otherwise interlaced or overlapped such that the strands are in contact with other similar strands or successive turns of themselves. Because of the high moduli, brittleness, and relatively poor abrasion resistance of the strands or the fibers which comprise them, they have been difficult to handle during their processing and weaving into fabrics and tapes. In some cases, poor abrasion resistance remains a problem after weaving because of structural damage to the fabric caused by interstrand or interfilament abrasion within strands due to the normal bending and flexing encountered in essentially all of the fabric end uses. The utilization of the new fibers, yarns, tows, fabrics and tapes in many applications for which there are properties otherwise suited to them, has not been possible because of these disadvantages.

It has been found that the abrasion resistance of certain fibrous materials can be increased by use of a finish composition. One such composition which is disclosed in U.S. Pat. No. 3,501,431, Ross et al., SIZING SYSTEM FOR HIGH MODULUS FIBERS AND METHOD AND APPARATUS FOR APPLYING SAME, is comprised of an elastomer, a lubricious substance and a solvent. The elastomer is chosen from fluorinated elastomers, urethanes and flexible vinyl chloride. While finish compositions such as this have been found to increase the abrasion resistance somewhat, they do not afford sufficient protection against mechanical damage and filament breakage for many applications and particularly in the case of certain fibers. In still other applications dusting and linting of the fibrous materials may not be reduced to reasonable or acceptable levels by such finish compositions. Further disadvantages reside in the fact that many such prior art finish composition are flammable, give off considerable smoke and toxic fumes when exposed to high temperatures such as upon removal of the finish or upon use of the material and may not be easily removed from the fibrous material when desired.

Accordingly, it would be desirable to provide an improved finishing system for application to strands of fibers or filaments of frangible material to enable them to be woven or otherwise converted into fabric or tape or to enable them to withstand bending or flexing during use without failing prematurely because of poor abrasion resistance.

It would furthermore be desirable to provide a finish system which is non-flammable, is low smoking and does not give off toxic fumes or other toxic byproducts when exposed to high temperatures and is easily removed from the fibrous material when desired.

BRIEF DESCRIPTION OF THE INVENTION

The present invention utilizes the combination of an elastomeric material and a lubricious substance in an aqueous emulsion in which both the elastomeric material and the lubricious substance are dispersed. The lubricious substance and the elastomer are chemically and physically incompatible to a degree such that they separate upon driving off the water, thereby destroying the emulsion. When the aqueous emulsion is applied to the surface of fibrous material and the water is driven off, the lubricious substance separates from the elastomer and exudes to the surface of the elastomeric sheath surrounding the fibers or filaments where it is available as a lubricant to mitigate the effects of abrasion during weaving and use. At the same time the relative paucity of lubricant in the interior of the strand is also advantageous in that interfilament movement which would affect the strength of the strand by disrupting the cohesive forces between filaments or fibers is not promoted.

The elastomeric material comprises a latex of a rubber such as butyl rubber or butadiene/nitrile type rubbers. In many instances hydrocarbons are preferred because of their low cost, cleanliness and non-toxicity when exposed to high temperatures. The lubricious substance is preferably an emulsion of a hydrocarbon type wax such as paraffin which is basically incompatible with elastomeric substances so as to produce the desired dispersion and separation upon drying of the water dispersant. For some applications a surfactant is added to the elastomer and lubricious substance to enhance the stability of the emulsion before coating.

The finish coating is applied to the fibrous material such as by dip coating followed by air drying. In the case of certain materials such as carbonaceous fibers and filaments which are prone to damage and breakage during the weaving operation, the fibers or filaments are preferably coated after formation and prior to weaving. When the desired article has been woven, the dried finish may be removed such as by solvent extraction or by burning. In still other instances where materials such as silica must be protected against dusting, linting and breakage or other failure after the article has been woven, it may be desirable to first weave the article after which the finish composition is applied to form a coating which is allowed to remain as a permanent part of the woven article.

Finish compositions in accordance with the invention have been found to provide fibrous materials with abrasion resistance including break and tear strengths which are far superior to the results provided by prior art coatings. In addition such compositions are very effective at reducing dusting and linting, are easily removed from the fibers when desired, are non-flammable and are low-smoking and non-toxic when exposed to high temperatures.

DETAILED DESCRIPTION

Finish compositions in accordance with the invention employ the combination of an elastomeric material and a lubricious substance in an aqueous emulsion in which both the elastomeric material in the lubricious substance are dispersed. It is necessary that the lubricious substance and the elastomer be chemically and physically incompatible to a degree such that they will separate upon driving off the water, thereby destroying the emulsion as a dry finish coating is formed on the fibrous material.

The substances to be employed as the elastomeric constituent of the finish are preferably chosen from the class of formulations known as rubber latices. Elastomers within this class capable of rendering especially advantageous results are a butyl latex sold by Exxon Chemical Company under the trademark BUTYL LATEX 100 and the butadiene/nitrile copolymer latices such as those sold by B. F. Goodrich Company under the trademarks HYCAR 1561 and HYCAR 1572. Butyl rubbers are typically polymers of isobutylene copolmerized with small amounts of isoprene. Another rubber latex which is suitable for certain applications is the high strength butyl rubber latex sold by Exxon Chemical Company under the trademark EMD 604. Other types of rubber latices which can be used in some instances include butadiene/styrene copolymer latices. In general, hydrocarbon type polymers are preferred as the elastomers because they are economical, clean and non-toxic. However, as noted above other types of polymers and copolymers can be used.

The lubricious component of the finish system may be of the class of emulsified paraffinic waxes such as, for example, that sold by Lenox Chemical Company under the trademark LENOLENE AC. Other materials that may be used include the class of poly (oxethylene) ethers and esters such as, for example, those sold by Atlas Chemical Division of I. C. I. America, Inc. under the trademarks BRIJ 30, BRIJ 78, and MYRJ 45, or the class of poly (oxethylene)/ poly (oxypropylene) copolymer polyols such as, for example, that series of products sold by Industrial Chemicals Group of Basf Wyandotte Corporation under the trademark PLURONIC POLYOL. As mentioned above, however, the choice of the elastomeric and lubricious components for use in a particular system must be such that the two are mutually incompatible while, at the same time, being capable of being emulsified or dissolved in water so that they may be applied as a size to the strands, fibers, filaments, yarns or tows by conventional means such as immersion. Hydrocarbon type waxes such as paraffin are generally preferred because of their basic incompatibility with those substances preferred for use as the elastomer.

While both the elastomer and lubricious substance emulsions contain surfactants in the combined aqueous emulsion, it is desirable for many applications to add a further surfactant to the emulsion to further stabilize the composition. One surfactant which has been found suitable for use with elastomers and lubricious substances of the type noted above is that product sold by Rohm and Haas Company under the trademark TRITON X-100.

The dispersant used in formation of the emulsion may be any appropriate substance which is easily removed and non-toxic. Water is generally preferred for many applications and in a form having a relatively low chloride content such as in the case of deionized water or distilled water.

As previously noted the finish composition is typically applied as a size to the strands, fibers, filaments, yarns, or tows by conventional means such as immersion. Thereafter, the water is driven off, preferably at an elevated temperature, such as by exposing the treated strands to heated and/or rapidly moving air or infrared radiation. After drying, the treated fibers, filaments, yarns, or tows may be wound upon conventional spools, reels, bobbins, pirns, cones or other packaging media for supply to a loom or other weaving or interlacing device or procedure. As noted above the lubricious component exudes to the elastomer surface during drying, especially the outer strand surface where it is available as a lubricant. The elastomer, having penetrated the interspaces between the fibers or filaments of the yarn, strand or tow, coats each of the fibers or filaments, thereby affording protection from interfilament abrasion and movement during weaving and subsequent flexing encountered during use of the fabric. The finish reduces the detrimental effects that occur as the otherwise frangible yarn passes over and through bars, guides, and eyes in a weaving apparatus and through openings therein where abrasion will occur. As a result, the high modulus, high tensile strength refractory fibers and filaments that have been developed in the art can be woven into fabrics, tapes, or other structures, thereby expanding significantly the scope of their potential application. In addition, the finish reduces the detrimental effects that occur as already woven structures are handled and used in such a manner as would otherwise cause abrading or tearing thereof.

In the case of carbonaceous fibers such as those made of carbon or graphite, the finish composition is preferably applied to the fibers or filaments prior to weaving since the danger of mechanical damage and breakage of the fibers is greatest during weaving. Thereafter, the finish can remain on the various fibers of the woven structure but is preferably removed. Both butyl latex and butadiene/nitrile type rubber latices have been found to be suitable for use with carbonaceous fibers. In addition to providing the fibers with high abrasion resistance the finish composition used on carbonaceous materials must be non-flammable and low-smoking and non-toxic when exposed to high temperatures such as is typically the case during removal of the finish. In addition the finish must be easily removable. It has been found that finish compositions according to the invention have such properties. In addition to providing the fibers with superior abrasion resistance and being non-flammable and low-smoking any gases or byproducts resulting from exposure to high temperatures are non-toxic in nature and in cases where the finish composition is essentially of all hydrocarbon composition consist of small amounts of carbon dioxide and water.

Where the finish is to be removed from the fibers following weaving, this is usually done by solvent extraction or burning. Where solvent extraction is used the woven structure is wound onto a porous bobbin and placed in an extractor. Where burning is used the woven structure is placed in an oven or low temperature furnace with a good air supply to enhance removal of the finish. Temperatures less than 1000° C. and residence times of a few seconds to a few minutes are typically used.

Where the fibers are comprised of a material such as silica, the greatest danger of mechanical failure or breakage usually exists not during the weaving operation but after the woven structure is put into use for certain applications such as a welding screen. In such instances the structure is first woven from the fibers or filaments, after which the individual fibers or filaments are coated with the finish composition which is allowed to remain as a permanent part of the woven structure. Finish compositions containing butyl latex have been found to produce excellent results with silica fibers. As in the case of carbonaceous fibers the finish compositions applied to silica fibers should be non-flammable, low-smoking and non-toxic in addition to providing the fibers with high abrasion resistance. It is also necessary or desirable that the finish reduce the dusting and linting characteristic of articles woven of silica fibers. Finish compositions in accordance with the invention have been found to have such properties.

As noted above, finish compositions in accordance with the invention typically have a solids content of about up to 1%. Higher concentrations such as solids contents of up to 3% can be used in some situations with the thicker coating that results providing even greater abrasion resistance at the expense of increased smoking when the coating is exposed to high temperatures.

The invention generally described thus far may be better understood by referring to certain specific embodiments and examples.

EXAMPLE 1

A sample of carbon tow comprised of continuous filaments of about 0.7 denier per filament was passed through an emulsion consisting of 5½ parts by weight of butadiene/nitrile copolymer latex, two parts by weight of an emulsion of paraffin wax, and 115 parts by weight of water. The treated tow was then dried by exposing it to infrared radiation from commercially available heat lamps. The finished carbon tow was then subjected to abrasion testing whereby the fibers, filaments, yarns or tows to be so tested are drawn reciprocally over a polished metal rod until failure occurs, the measure of abrasion resistance being the number of machine cycles counted before said failure. The treated carbon tow of this example survived an average of 49,000 cycles whereas an untreated sample of the same material survived only an average of 12,000 cycles.

EXAMPLE 2

A sample of the carbon tow described in Example 1 was passed through an emulsion consisting of 4½ parts by weight of butadiene/nitrile copolymer latex, 2 parts by weight of an emulsion of paraffin wax, and 116 parts by weight of water. After drying, the sized carbon tow was subjected to abrasion testing. Finished samples of carbon tow survived an average of 55,000 cycles compared with an average of 12,000 cycles for samples of uncoated carbon tow.

EXAMPLE 3

A sample of carbon tow comprised of continuous filaments of about 0.7 denier per filament was passed through an emulsion consisting of 5 parts by weight of butyl rubber latex, 4 parts by weight of an emulsion of paraffin wax and 114 parts by weight of water. Drying and abrasion testing were carried out by the method of Example 1. The results of said abrasion testing were that finished carbon tow samples survived an average of 123,000 cycles while the untreated carbon tow samples survived an average of 7,000 cycles.

EXAMPLE 4

A sample of carbon tow consisting of continuous filaments of about 0.7 denier per filament was passed through an emulsion consisting of 5 parts by weight of butadiene/nitrile copolymer latex, ½ part by weight of a poly (oxethylene) stearate, and 95 parts by weight of water. After drying, the sized carbon tow was subjected to abrasion testing by the method of Example 1. Samples of finished carbon tows survived an average of 99,000 cycles whereas the untreated samples of carbon tow survived an average of 2,000 cycles.

EXAMPLE 5

A sample of carbon tow consisting of continuous filaments of about 0.7 denier filament was passed through an emulsion consisting of 100 parts by weight of HYCAR 1561 latex, 37 parts by weight of LENOLENE AC and 2106 parts by weight of water. Samples of finished carbon tows survived an average of 48,000 cycles of abrasion testing whereas the untreated samples survived an average of 13,000 cycles.

EXAMPLE 6

A sample of carbon tow consisting of continuous filaments of about 0.7 denier per filament was passed through an emulsion consisting of 100 parts by weight of HYCAR 1572 latex, 46 parts by weight of LENOLENE AC and 2588 parts by weight of water. After drying, the sized carbon tow was subjected to abrasion testing. Samples of finished carbon tows survived an average of 55,000 cycles whereas untreated samples of carbon tow survived an average of 13,000 cycles.

EXAMPLE 7

A sample of carbon tow consisting of continuous filaments of about 0.7 denier per filament was passed through an emulsion consisting of 100 parts by weight of BUTYL LATEX 100, 78 parts by weight of LENOLENE AC and 2220 parts by weight of water. After drying, the sized carbon tow was subjected to abrasion testing. Samples of finished carbon tows survived an average of 123,000 cycles.

EXAMPLE 8

Samples of cloth woven from fibers of substantially silica composition and sold by HITCO of Gardena, California under the trademark REFRASIL were coated with a finish composition consisting of the following:

| Component | Parts By Weight | % Solids By Weight |
| --- | --- | --- |
| Exxon BUTYL LATEX 100 | 100.0 | .80 |
| LENOLENE AC | 58.0 | .22 |
| TRITON X-100 | 1.6 | 0.02 |
| De-ionized Water | 7715.0 | 0 |
| | | 1.04 |

The samples of REFRASIL cloth coated with the finish composition included those bearing the manufacturers part number UC100-48 having a weight of 18 ounces per square yard and those bearing the manufacturers part number UC100-96 having a weight of 35 ounces per square yard. Samples of coated and uncoated REFRASIL in both weights were then tested, producing the following results:

| Characteristic | Units | UC100-48 UN-TREATED | UC100-48 TREATED | UC100-96 UN-TREATED | UC100-96 TREATED |
| --- | --- | --- | --- | --- | --- |
| 1) Break strength (warp direction) | (lbs./in.) | 136 | 135 | 197 | 230 |
| 2) Break strength (fill direction) | (lbs./in.) | 74 | 88 | 167 | 191 |
| 3) Tear strength (warp direction) | (lbs.) | 3.5 | 7.2 | 9.9 | 15.5 |
| 4) Tear strength (fill direction) | (lbs.) | 3.4 | 6.8 | 9.9 | 14.2 |
| 5) Abrasion resistance | (cycles) | 27 | 159 | 74 | 375 |
| 6) Linting/dusting | — | Very Dusty | No Dust | Very Dusty | No Dust |
| 7) Flammability | — | Won't Burn | Won't Burn | Won't Burn | Won't Burn |
| 8) Smoke emission | — | None | None | None | None |

A finish composition which uses a high strength butyl rubber latex and which has been found to produce good results when coated on REFRASIL cloth has the following formulation:

| Component | Parts by Weight |
| --- | --- |
| Exxon EMD 604 High Strength butyl rubber latex | 116.7 |
| LENOLENE AC | 58.0 |
| TRITON X-100 | 1.6 |
| De-ionized water | 7698.0 |

While the invention has been particularly described with reference to preferred examples thereof, it will be understood by those skilled in the art that various changes in form and details may be made therein without departing from the spirit and scope of the invention.

What is claimed is:

1. A finish composition for fibrous members comprising a rubber latex and a wax emulsion, the rubber of the latex being incompatible with the wax of the emulsion, the rubber latex and the wax emulsion forming an aqueous emulsion having a solids concentration by weight of not substantially less then about 1% nor more than about 3% and the weight of the wax emulsion being 10-80% of the weight of the rubber latex.

2. The invention set forth in claim 1, wherein the aqueous emulsion has a solids concentration by weight of about up to 1%.

3. The invention set forth in claim 1, wherein the rubber latex consists of a latex of a hydrocarbon polymer and the wax emulsion consists of an emulsion of a hydrocarbon wax.

4. The invention set forth in claim 1, wherein the rubber latex is chosen from the group consisting of butyl rubber latex and butadiene/nitrile copolymer latex and the wax emulsion consists of an emulsion of paraffin wax.

5. The invention set forth in claim 4, wherein the rubber latex consists of butyl rubber latex.

6. The invention set forth in claim 4, wherein the rubber latex consists of butadiene/nitrile copolymer latex.

7. A finish composition for fibrous members consisting of an aqueous emulsion of an elastomer and a lubricious substance, the elastomer and the lubricious substance both being dispersed in the aqueous emulsion, the aqueous emulsion being made from a butyl rubber latex, a paraffin wax emulsion, a surfactant and water, the butyl rubber latex being approximately 100.0 parts-by-weight and 0.80% solids-by-weight of the finish composition, the paraffin wax emulsion being approximately 58.0 parts-by-weight and 0.22% solids-by-weight of the finish composition, the surfactant being approximately 1.6 parts-by-weight and 0.02% solids-by-weight of the finish composition and the water being approximately 7715.0 parts-by-weight and 0% solids-by-weight of the finish composition.

8. A method of treating fibers comprising the steps of: immersing the fibers in an aqueous dispersion of an elastomer and a lubricious substance which is incompatible with the elastomer to coat the fibers, the aqueous dispersion consisting of 0.1-3.0% solids, the elastomer being in the form of a latex and the lubricious substance being in the form of an emulsion having a weight equal to 10-80% of the weight of the latex of the elastomer; and thereafter drying the coating to form a dry mixture of the elastomer and the lubricious substance on the surface of the fibers in which the lubricious substance is substantially separated from the elastomer and is substantially at the surface of the dry mixture.

9. The invention set forth in claim 8, wherein the elastomer consists of butyl rubber and the lubricious substance consists of paraffin wax.

10. An improved fiber comprising a fibrous strand of material of substantially silica composition having a coating thereon comprising a mixture of butyl rubber and paraffin wax.

11. The invention set forth in claim 10, wherein the coating is formed from an aqueous dispersion of a butyl rubber latex and a paraffin wax emulsion which has a weight equal to 10-18% of the weight of the latex, the aqueous dispersion consisting of 0.1-3.0% solids.

12. An improved fiber comprising a fibrous strand of carbonaceous material having a coating thereon comprising a mixture of butadiene/nitrile rubber and paraffin wax.

13. The invention set forth in claim 12, wherein the coating is formed from an aqueous dispersion of a butadiene/nitrile rubber latex and a paraffin wax emulsion which has a weight equal to 10-80% of the weight of the latex, the aqueous dispersion consisting of 0.1-3.0% of solids.

14. A method of preparing a woven article from fibers of carbonaceous material comprising the steps of:
   providing a plurality of fibers of carbonaceous material;
   coating the fibers with an aqueous emulsion having a solids concentration by weight of not substantially less than about 1% and not more than about 3%, the aqueous emulsion being formed by a rubber latex and a wax emulsion, the rubber of the latex and the wax of the wax emulsion both being dispersed in the aqueous emulsion;
   drying the coating to form a dry mixture of rubber and wax on the surface of the fibers;
   weaving the fibers to form a woven article; and
   treating the woven article to remove the mixture of rubber and wax from the surface of the fibers.

15. A woven article comprising a plurality of interwoven fibers of substantially silica composition having a coating thereon consisting of a mixture of butyl rubber and paraffin wax.

16. A method of preparing a woven article from fibers of silica material comprising the steps of:
   providing a plurality of fibers of silica material;
   weaving the fibers to form a woven article;
   coating the fibers of the woven article with an aqueous emulsion having a solids concentration by weight of not substantially less than about 1% and not more than about 3%, the aqueous emulsion being formed by a rubber latex and a wax emulsion, the rubber of the latex and the wax of the wax emulsion both being dispersed in the aqueous emulsion; and
   drying the coating to form a dry mixture of rubber and wax on the fibers.

* * * * *

UNITED STATES PATENT AND TRADEMARK OFFICE
CERTIFICATE OF CORRECTION

PATENT NO. : 4,096,104

DATED : June 20, 1978

INVENTOR(S) : Raymond G. Spain and Albert L. Miller

It is certified that error appears in the above-identified patent and that said Letters Patent are hereby corrected as shown below:

Column 8, line 57, after "to" and before "of the" (first occurrence), "10-18%" should read --10-80%--.

Signed and Sealed this

Seventh Day of November 1978

[SEAL]

Attest:

RUTH C. MASON
Attesting Officer

DONALD W. BANNER
Commissioner of Patents and Trademarks